(12) United States Patent
Hoover (10) Patent No.: US 9,630,809 B2
(45) Date of Patent: Apr. 25, 2017

(54) LIFTING HOOK, SAFETY LATCH OF LIFTING HOOK AND LOCKING AND RELEASING DEVICE OF SAFETY LATCH

(71) Applicant: KONECRANES PLC, Hyvinkää (FI)

(72) Inventor: Jack Hoover, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 0 days.

(21) Appl. No.: 14/760,146

(22) PCT Filed: Jan. 10, 2014

(86) PCT No.: PCT/FI2014/050017
§ 371 (c)(1),
(2) Date: Jul. 9, 2015

(87) PCT Pub. No.: WO2014/108604
PCT Pub. Date: Jul. 17, 2014

(65) Prior Publication Data
US 2015/0353327 A1 Dec. 10, 2015

(30) Foreign Application Priority Data
Jan. 11, 2013 (FI) ...................................... 20135033

(51) Int. Cl.
*B66C 1/36* (2006.01)
*F16B 45/02* (2006.01)
(52) U.S. Cl.
CPC ................ *B66C 1/36* (2013.01); *F16B 45/02* (2013.01)
(58) Field of Classification Search
CPC .............. B66C 1/36; B66C 1/34; F16B 45/02
(Continued)

(56) References Cited

U.S. PATENT DOCUMENTS 1,626,866 A * 5/1927 Neilson ................... E21B 19/04
24/599.7
3,008,210 A 11/1961 Stovern
(Continued)

FOREIGN PATENT DOCUMENTS

CN 2693731 Y 4/2005
CN 201087068 Y 7/2008
(Continued)

*Primary Examiner* — Paul T Chin
(74) *Attorney, Agent, or Firm* — Birch, Stewart, Kolasch & Birch, LLP (57) ABSTRACT

A lifting hook, its safety latch and a locking and releasing device of the safety latch are disclosed. The lifting hook includes a hook body having a hook stem and tip. The safety latch has a fastening end and a free latch end, the fastening end of the safety latch being pivotally fastened close to the stem so as to move the safety latch between an open position and a closed position, the safety latch being in its open position substantially against the inside of the hook body in a position that leaves a hook jaw free, while in the closed position the latch end extends across the hook jaw to the hook tip, closing the jaw on the inside thereof. A spring arranged between the safety latch and hook body forces the latch end into the closed position. The locking and releasing device includes a locking and releasing lever that is arranged to turn freely between a turning axle of the safety latch and latch end in the front area of the safety latch and that in its locking position rests against the hook tip and keeps the safety latch in its open position against the inner side of the hook body.

22 Claims, 9 Drawing Sheets

(58) Field of Classification Search
USPC ........... 294/82.17, 82.19, 82.2, 82.24, 82.31, 294/82.33; 24/599.1, 599.2, 599.4, 599.5, 24/599.6, 600.1
See application file for complete search history.

(56) References Cited

U.S. PATENT DOCUMENTS

| | | | |
|---|---|---|---|
| 4,013,314 A * | 3/1977 | Archer | B66C 1/36 24/599.8 |
| 4,039,220 A * | 8/1977 | Stoops | B66C 1/36 24/600.1 |
| 4,955,651 A * | 9/1990 | Barber | B66C 1/36 24/599.8 |
| 5,005,266 A | 4/1991 | Fister et al. | |
| 5,480,202 A * | 1/1996 | Gloden | B66C 1/36 24/599.8 |
| 5,577,787 A | 11/1996 | Klope | |
| 5,664,304 A * | 9/1997 | Tambornino | B66C 1/36 24/370 |
| 6,519,818 B1 * | 2/2003 | Chang | B66C 1/36 24/599.4 |
| 6,601,274 B2 * | 8/2003 | Gartsbeyn | F16B 45/02 24/599.8 |
| 9,284,162 B2 * | 3/2016 | Rytkonen | B66C 1/36 |
| 2004/0036303 A1 * | 2/2004 | Yu | F16B 45/02 294/82.19 |

FOREIGN PATENT DOCUMENTS

| | | |
|---|---|---|
| CN | 201264864 Y | 7/2009 |
| CN | 201660364 U | 12/2010 |
| CN | 102050381 A | 5/2011 |
| JP | 8-12252 A | 1/1996 |

\* cited by examiner

LIFTING HOOK, SAFETY LATCH OF LIFTING HOOK AND LOCKING AND RELEASING DEVICE OF SAFETY LATCH

BACKGROUND OF THE INVENTION

The invention relates to a lifting hook comprising a hook body with a hook stem and a hook tip; a safety latch with a fastening end and a free latch end, the fastening end of the safety latch being pivotally fastened close to the hook stem so as to move the safety latch between an open position and a closed position, the safety latch being in its open position substantially against the inside of the hook body in a position that leaves a hook jaw free, while in the closed position of the safety latch the latch end extends across the hook jaw to the hook tip and against it, resting against the inside of the hook body and its jaw, closing the jaw; and means for actuating the safety latch, the means comprising a spring arranged between the safety latch and the hook body and forcing the latch end into the closed position, and locking and releasing device for locking the safety latch into the open position and for releasing the safety latch from the open position. The invention also separately relates to a safety latch to be attached to existing hooks, the safety latch being of the above-described type, and to a locking and releasing device of the lifting hook safety latch that can be mounted on existing safety latches that are also of the above-described type.

The purpose of a safety latch for a lifting hook is to assist a user of the lifting hook of a crane to load and unload the hook safely and efficiently. The loading of the hook naturally refers to fastening a load to the hook and the unloading, correspondingly, to releasing the load from the hook. Safety and efficiency are considerably increased if the user is able to use both hands at the same time for releasing the load.

In known hooks, the safety latch is typically pressed open against a spring force pushing the safety latch closed, and kept in the open position with one hand. This prevents the use of the other hand for releasing the load as the hand must be used for keeping the safety latch open all the time when the load is being released. Moreover, opening the safety latch of large hooks and keeping it open requires a lot of force. Hence the load is very difficult to release and often another person is needed to keep the safety latch open. There is also a risk of hands or fingers getting caught between the safety latch and the hook body. All this may lead to a temptation to skip the use of the safety latch, for example by tying it permanently into the open position against the inside of the hook body with tape.

However, methods have been developed to keep the safety latch open without the user having to use his/her hands for it. For example, the safety latch may be provided with a kind of operating handle attached pivotally to the safety latch, at a distance from its fastening end, the handle extending around the hook body and being lockable behind the hook body into a position keeping the safety latch open. A safety latch of this type is disclosed in U.S. Pat. No. 3,008,210. In this solution, however, the handle has to be separately released after the load has been detached in order to tension the safety latch again to the closed position. This releasing action may require quite a lot of strength, and if the safety latch has a powerful spring, the user may still hurt his/her hands if they for some reason get caught between the operating handle and the hook body or between the latch end of the safety latch and the hook body. Then again, if the safety latch is left or forgotten completely open after a load has been fastened and for the duration of a subsequent lifting, the safety latch is of no use. Inserting a hoist belt with one hand into the hook jaw easily rotates the hook. In many cases, handling a hoist belt with two hands prevents the hook from rotating around its vertical axis during handling.

SUMMARY OF THE INVENTION

Thus, an object of the invention is to improve the lifting hook and its safety latch so as to enable the aforementioned problems to be solved. This object is achieved by a solution of the invention that is characterised in that the locking and releasing device of the safety latch comprises a locking and releasing lever that is arranged to turn freely between a turning axle of the safety latch and latch end in the front area of the safety latch and that in its locking position rests against the hook tip and keeps the safety latch in its open position against the inside of the hook body. Preferred embodiments of the invention are disclosed in the dependent claims.

The invention is based on a lever that is arranged on the safety latch at a distance from its turning axle and with which the safety latch can be kept in its open position by resting this level on the hook tip. Correspondingly, the safety latch is released by pushing the lever from either direction.

An advantage of the lifting hook and safety latch according to the invention is that the safety latch is convenient to use and reliable. Consequently, the safety latch improves safety without invoking in the operating staff any desire to avoid using it or to remove it from the actual lifting apparatus.

The safety latch of the invention is extremely simple, which also makes its manufacturing costs small. The use of the safety latch is also very easy, since its operation is clearly visible from its structure. Even though the locking and releasing lever was damaged, it would in not in any way endanger the safe usage of the lifting hook, because in case of damage to the lever, the safety latch always returns to the closed position.

The safety latch of the invention can also be installed afterward in existing lifting hooks, if their stems have a suitable fastening bore used earlier for a safety latch. If such a fastening bore does not exist, the safety latch can, in some cases, be fastened to the hook by means of a separate band structure, in which case no changes need to be made to the hook or its stem and the strength of the hook remains as originally intended. In addition, this allows the utilization of the original hook, which is usually made by forging and therefore a valuable manufactured piece.

The locking and releasing lever of the invention can also be installed in old safety latches that are possibly only kept open by hand, if they have suitable side edges for making fastening holes required for fastening the levers. In such a case, bringing the safety latch up to the present standards is especially advantageous.

LIST OF FIGURES

The invention will now be described in more detail by means of preferred embodiments and with reference to the accompanying drawings, and in all FIGS. 1 to 15 the lifting hook is the same.

DETAILED DESCRIPTION OF THE INVENTION

Referring first to FIGS. 1 to 4, a lifting hook 1 according to the invention comprises a hook body 2 provided with a hook stem 4 and a hook tip 5; a safety latch 6 with a fastening end 7 and a free latch end 8, the fastening end 7 thereof being pivotally fastened close to the hook stem 4 so as to move the safety latch between an open position and a closed position, the safety latch 6 being in its open position substantially against the inside of the hook body 2 in a position that leaves a hook jaw G free, while in the closed position of the safety latch 6 the latch end 8 extends across the hook jaw G to the hook tip 5, resting against it on the inside of the hook body 2 and its jaw G and closing the jaw G; and actuating means of the safety latch which comprise a spring 9 arranged between the safety latch 6 and the hook body 2 and forcing the latch end 8 into the closed position, and a locking and releasing device 10 for locking the safety latch 6 into the open position and releasing it from the open position.

The locking and releasing device of the safety latch comprises a locking and releasing lever 10 that is arranged to turn freely between a turning axle of the safety latch and the latch end 8 in the front area of the safety latch 6 and that in its locking position rests against the hook tip 5 and keeps the safety latch 6 in its open position against the inner side of the hook body 2.

More specifically, the locking and releasing lever 10 according to FIGS. 1 to 4 is made up of a bent wire loop, the ends 10a, 10b of which are fastened to the safety latch 6 to turn at its sides to make a closed loop-like locking and releasing lever 10.

When the safety latch 6 has the side edges 6a shown in FIGS. 1 to 4, holes 6b formed in them for the lever 10 to turn in can also be formed in any existing conventional safety latches, on which the lever 10 can then be mounted.

The lever or loop 10 is somewhat shorter than the safety latch 6, in other words, on the latch end 8 side of the safety latch 6, the front end of the lever or loop 10 rests on the safety latch 6 in the closed position of the safety latch 6, which means that it cannot turn behind the safety latch 6, when the safety latch 6 returns from the open position to the closed position.

The lever or loop 10 can be made of 3 mm-thick spring steel, for instance, in which case it can be cold bent into 90-degree angles.

Figure 1:
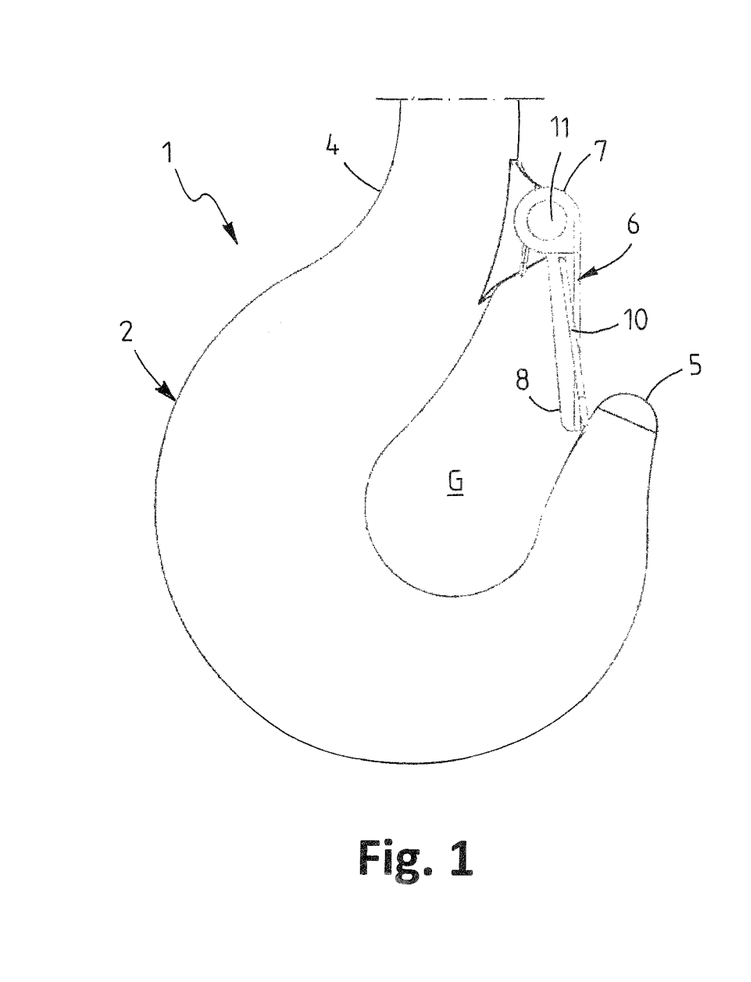
FIG. 1 is a side view of a preferred implementation of a safety latch of the invention in its closed position.

The operation of the safety latch 6 shown in FIGS. 1 to 4 is then as follows:

In FIG. 1 the lifting hook 1 and its safety latch 6 are in a normal closed position, which means that the latch end 8 of the safety latch 6 extends across the jaw G of the hook to the hook tip 5, resting against it on the inside of the hook body 2 and its jaw G and closing the jaw G. If in this position, a load is placed on the lifting hook 1, both the safety latch 6 and the locking and releasing lever 10 sink downward and the safety latch 6 is not locked, but both parts 6 and 10 return to their normal position that keeps the jaw G closed. The locking and releasing lever 10 returns to its place, lifted by the safety latch 6.

Figure 2:
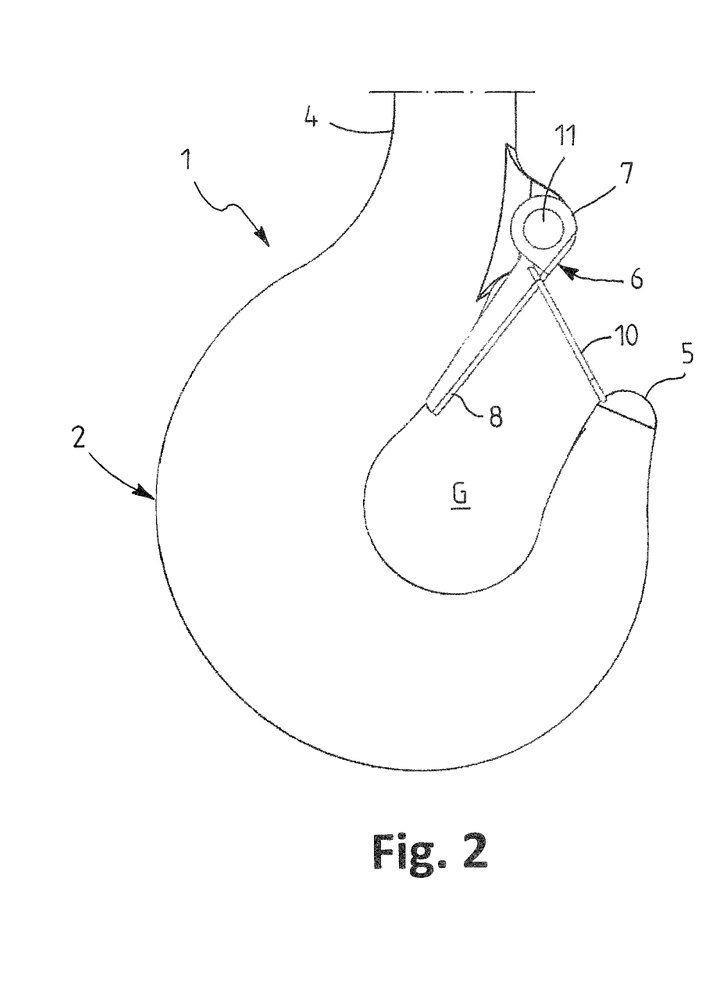
FIG. 2 shows the safety latch of FIG. 1 in its open position.
Figure 3:
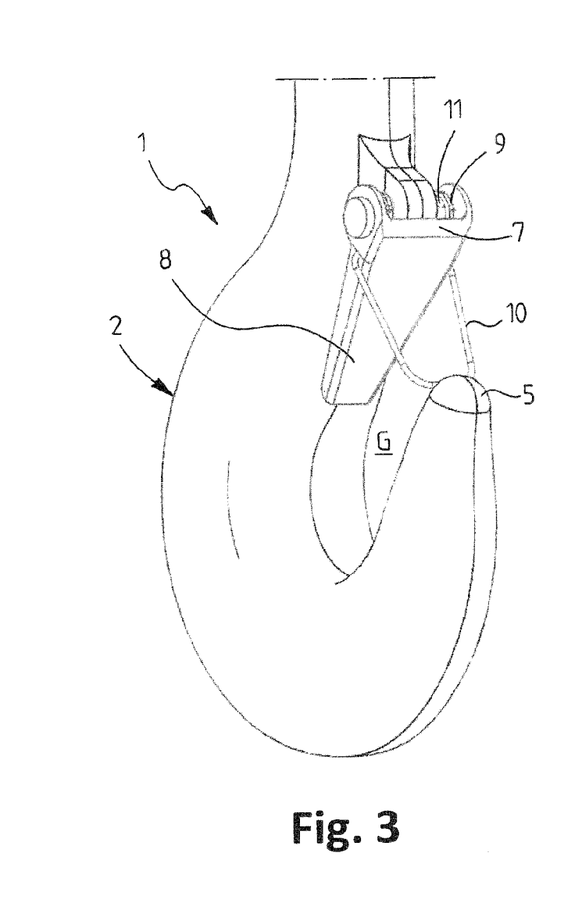
FIG. 3 is a perspective view of the safety latch of FIGS. 1 and 2 in its open position.
Figure 4:
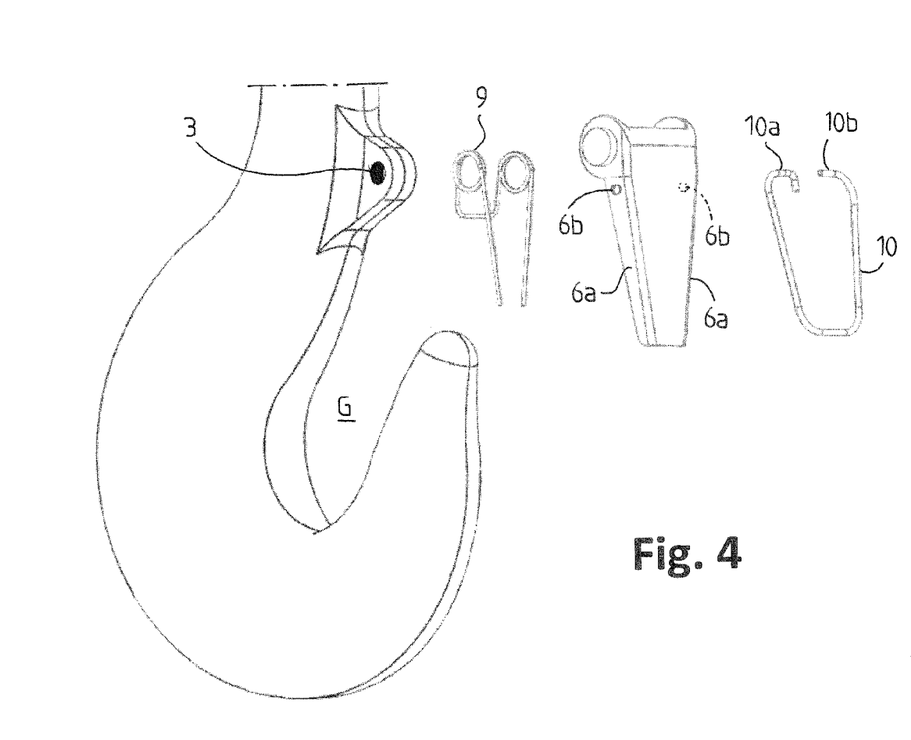
FIG. 4 is an exploded view of the safety latch according to FIGS. 1 to 3.

In FIG. 2, the safety latch 6 has been turned by hand against the inside of the hook stem 2, whereby the locking and releasing lever 10 settles or is settled by hand against the hook tip 5. Now the load may be removed from the lifting hook 1 with no further need to touch it by hand. When the load passes the locking and releasing lever 10, the safety latch 6 moves to its closed position taking the locking and releasing lever 10 with it in the manner described above. In the position of FIG. 2, the placing of the load in the lifting hook 1 is naturally also possible, in which case the locking and releasing lever 10 also moves the safety latch 6 into its closed position.

Figure 5:
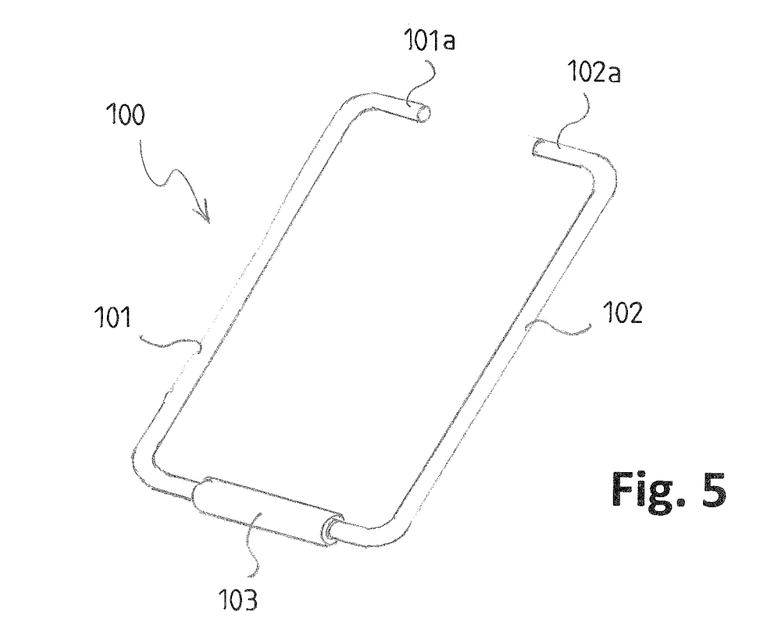
FIG. 5 is a modification of the locking and releasing lever shown in FIGS. 1 to 4.

FIG. 5 shows a modification of the locking and releasing lever shown in FIGS. 1 to 4, in which the locking and releasing lever 100 comprises a two-part bent wire loop, the halves 101, 102 of which are joined together by a connecting piece 103 in the area touching the hook tip 5 or latch end 8 of the safety latch 6 and the free ends 101a, 102a can be fastened to holes 6b on the side edges 6a of the safety latch 6, whereby the assembled locking and releasing lever 100 also resembles a closed loop. This solution is suitable for heavy lifting hooks, in which the wire material used in the locking and releasing lever 100 is quite rigid and bending a one-part lever into place in the safety latch 6 would be difficult. The connecting piece 103 is formed as a connecting sleeve with inner threads on the inside and the halves 101 and 102 having compatible outer threads. The connecting piece 103 preferably forms a rigging screw, in which the threads are right- and left-handed. The connecting piece 103 is also locked in place with a locking nut at one end or a locking screw drilled through the wall of the connecting piece 103. The connecting piece 103 may have on its outer surface driver surfaces for a suitable tool, or the connecting piece is held by tongs during twisting. At least the outer surface of the connecting piece 103 may be a rubber or plastic surface that provides suitable friction properties for cooperation with the hook tip 5. The connecting piece 103 may of course be made of a suitable synthetic material to combine all necessary properties in a piece made of one material.

Figure 6:
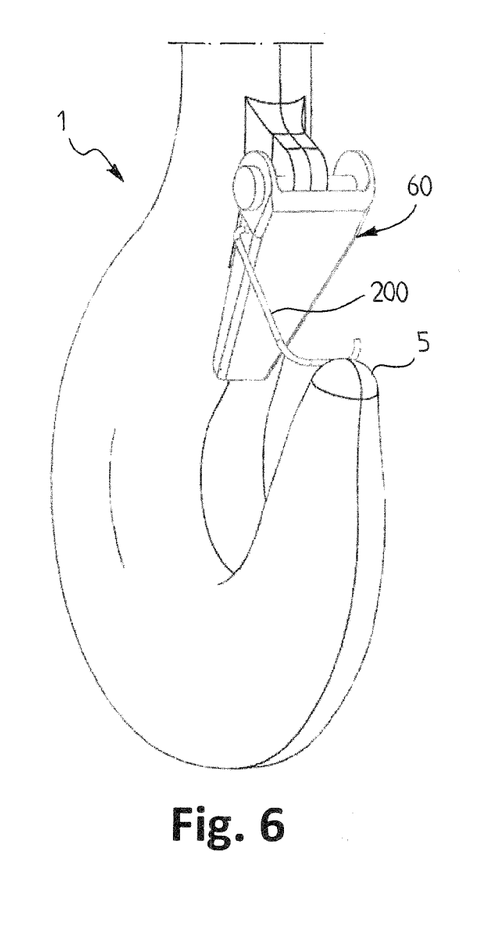
FIG. 6 is a perspective view of a second implementation of the safety latch according to the invention in its open position.
Figure 7:
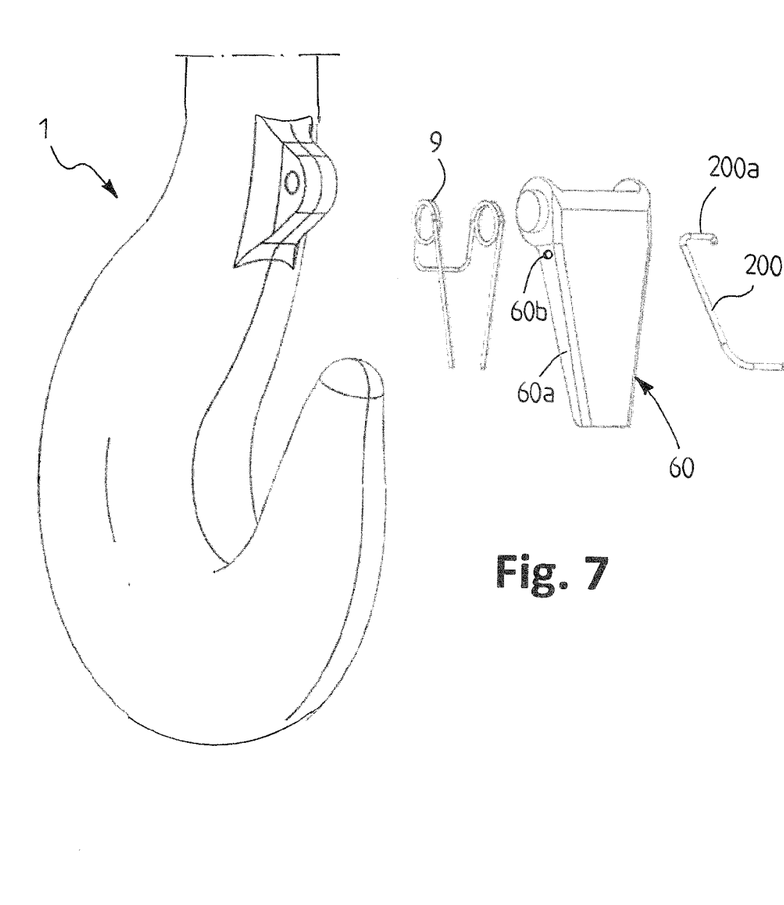
FIG. 7 is an exploded view of the safety latch according to FIG. 6.

The safety latch 6 and 7 according to FIGS. 6 and 7 is, in principle, similar to the safety latch 6 of the previous figures, but the locking and releasing lever 200 is formed of a bent wire loop that is only fastened at one end 200a to a hole 60b on one side edge 60a of the safety latch 60, whereby the locking and releasing lever 200 resembles an open loop. This locking and releasing lever 200, too, can be installed on conventional safety latches, but the installation hole 60b must be formed or modified in such a manner that the lever 200 cannot turn sideways. At the free end on the hook tip 5 side, the wire loop may also end in a closing loop or needle eye, in which case a hoist belt or the like cannot attach to the end of the wire loop.

Figure 8:
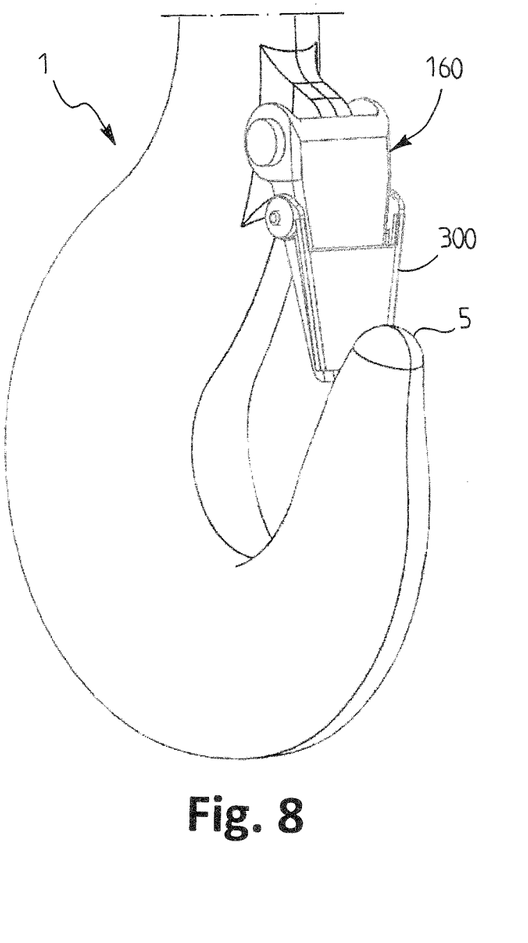
FIG. 8 is a perspective view of a third implementation of the safety latch according to the invention in its closed position.
Figure 9:
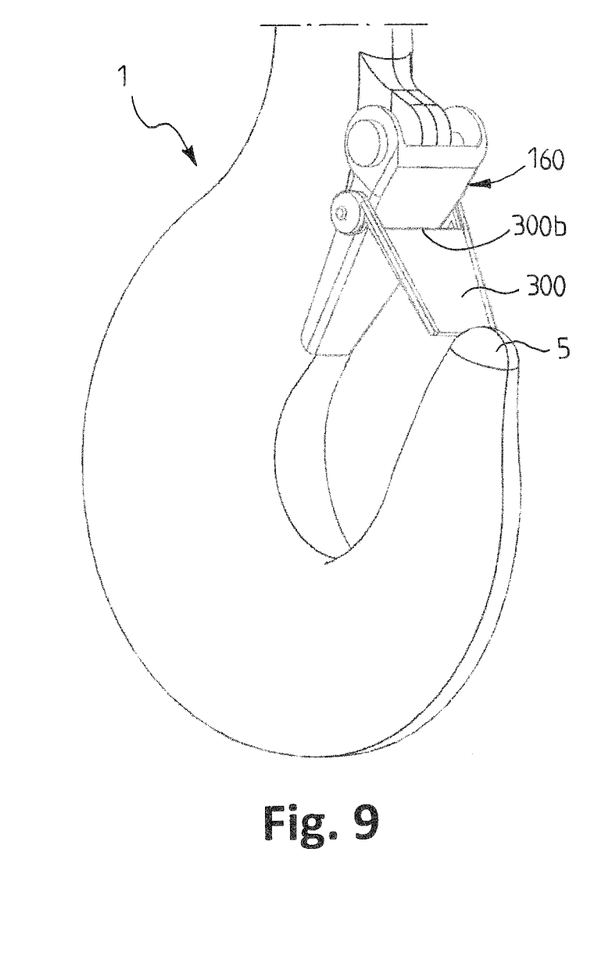
FIG. 9 shows the safety latch of FIG. 8 in its open position.
Figure 10:
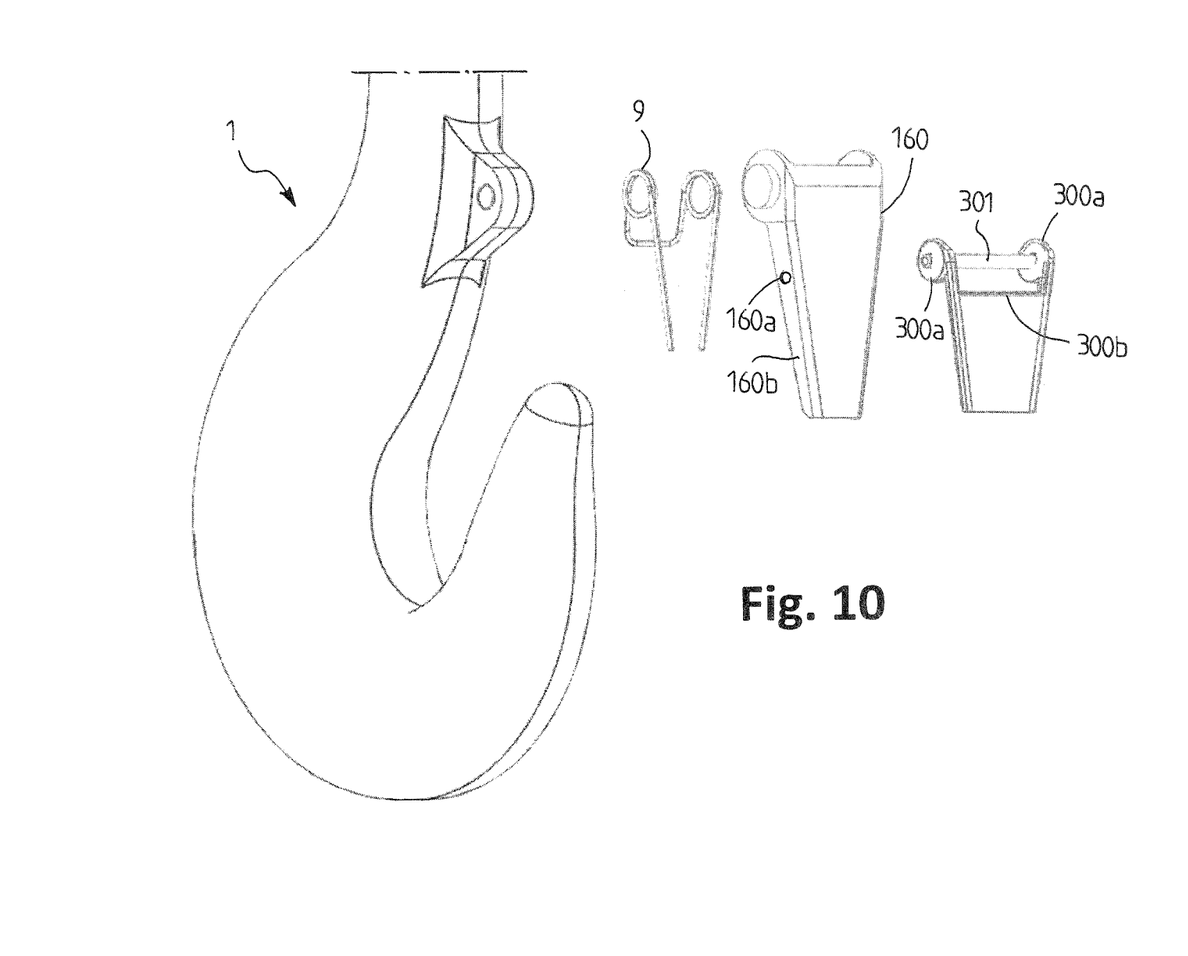
FIG. 10 is an exploded view of the safety latch according to FIGS. 8 and 9.

The safety latch 160 according to FIGS. 8 to 10 is also, in principle, similar to the safety latches 6 and 60 of the preceding figures, but the locking and releasing lever 300 is now formed of a plate-like part having on its sides fastening lugs 300a that extend to the sides of the safety latch 160, and the locking and releasing lever 300 is fastened to the side edges 160a of the safety latch 160 by a fastening pin 301 extending through the lugs. This structure provides the advantage that, with it, the safety latch 160 can be made to remain firmly in its open position, when the back edge 300b of the lever 300 is designed to rest against the front surface of the safety latch 160 in this position. This locking and releasing lever 300 is also suitable for installation in conventional safety latches.

Figure 11:
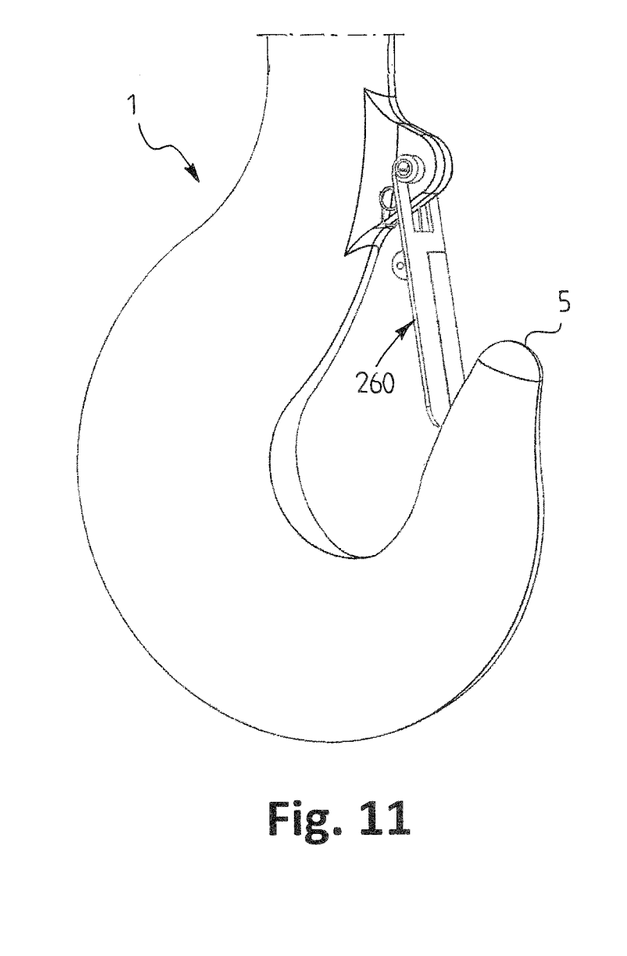
FIG. 11 is a perspective view of a fourth implementation of the safety latch according to the invention in its closed position.
Figure 12:
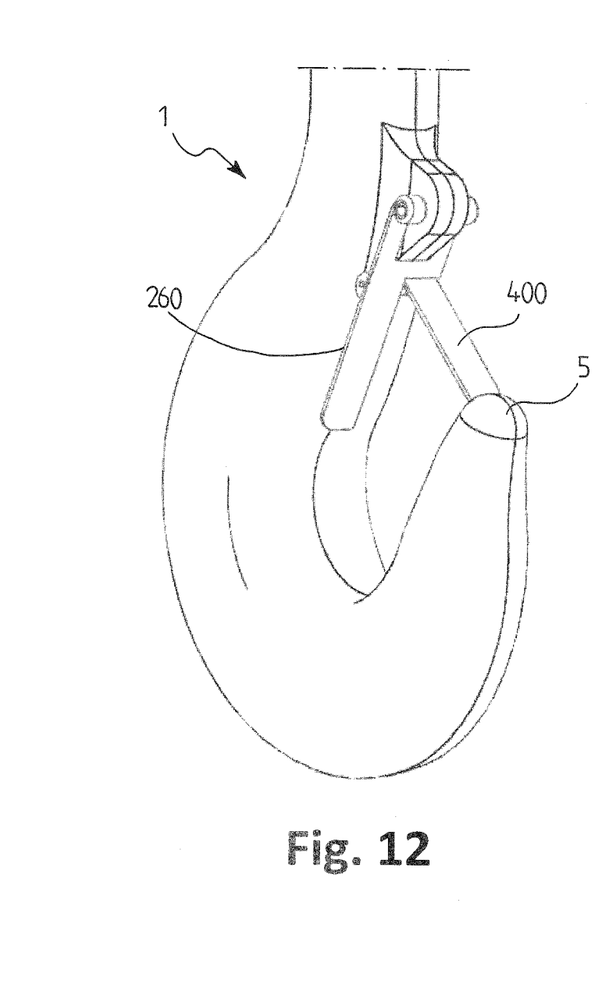
FIG. 12 shows the safety latch of FIG. 11 in its open position.
Figure 13:
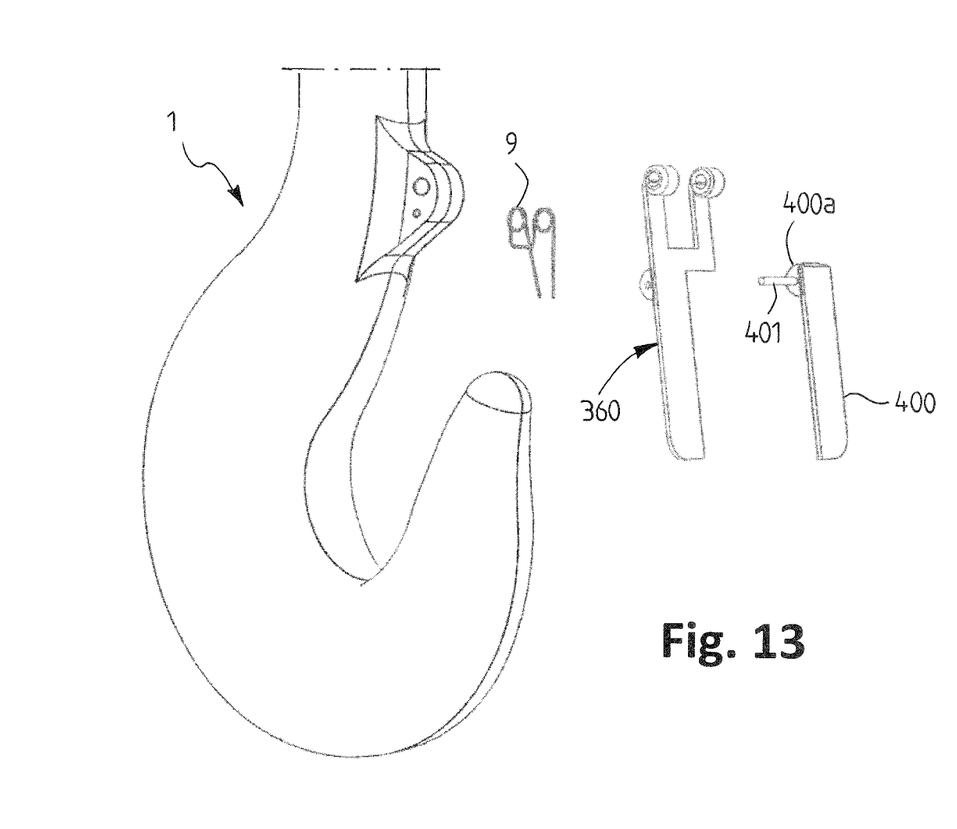
FIG. 13 is an exploded view of the safety latch according to FIGS. 11 and 12.

FIGS. 11 to 13 show a safety latch 260 having on one edge thereof a cutting, into which a locking and releasing lever 400 is arranged that fills the cutting and substantially complies with the shape of the adjacent safety latch portion. The back surface of the locking and releasing lever has a fastening lug 400a and the locking and releasing lever 400 is fastened to the back surface of the safety latch 260 by a fastening pin 401 passing through the lug. The turning of the locking and releasing lever 400 from the level of the safety latch 260 backward is prevented by the fastening lug 400a that extends to and rests against the back surface of the safety latch 260, when the parts 260 and 400 are level with each other.

Figure 14:
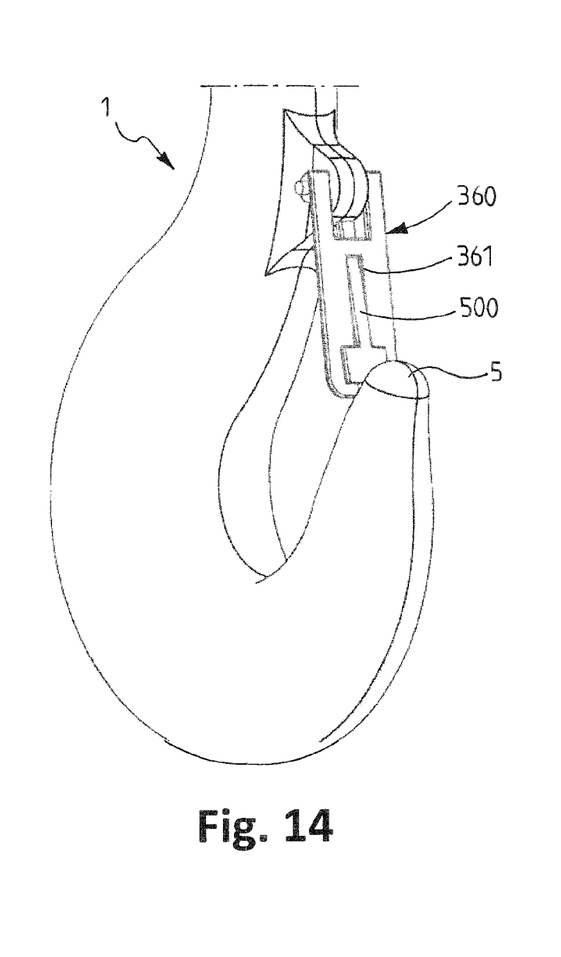
FIG. 14 is a perspective view of a fifth implementation of the safety latch according to the invention in its closed position.
Figure 15:
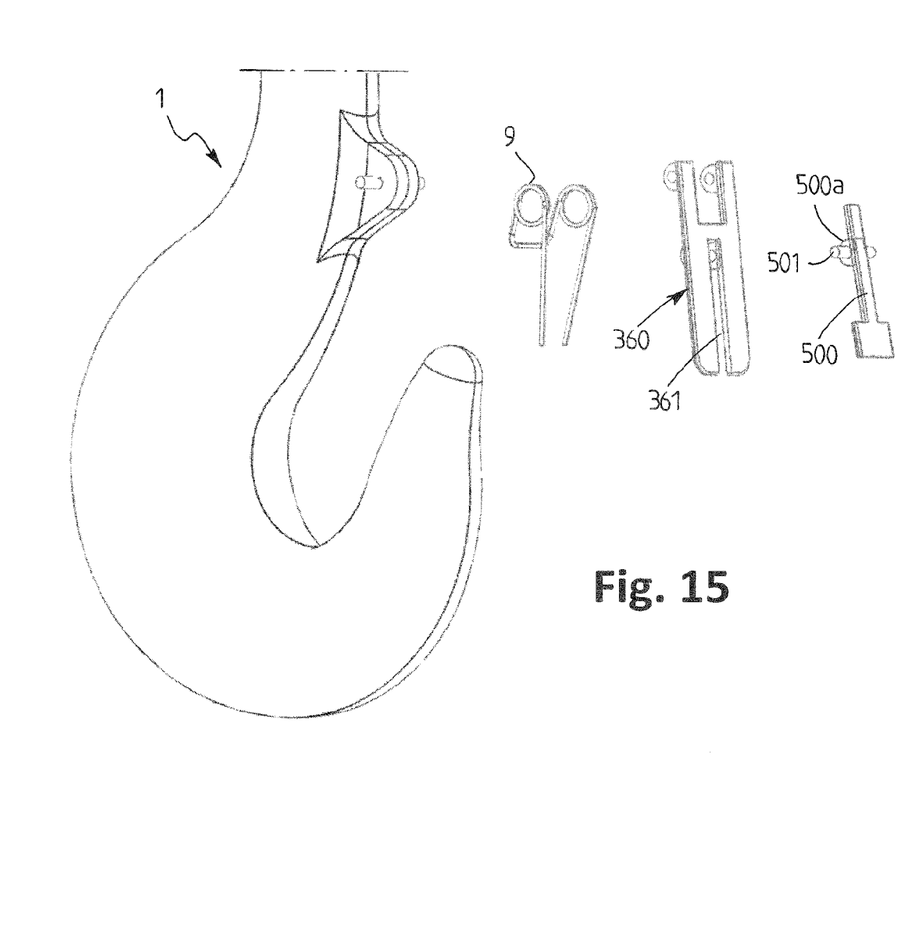
FIG. 15 is an exploded view of the safety latch according to FIG. 14.

Finally, FIGS. 14 and 15 show a safety latch 360 that has in its centre a longitudinal cutting 361, into which a locking and releasing lever 500 is arranged that fits into this cutting and extends partly to the top surface of the safety latch 360. The back surface of the lever 500 has a fastening lug 500a, and the locking and releasing lever 500 is fastened to the back surface of the safety latch (360) by a fastening pin 501 passing through the lug.

The safety latch structure described above, at least when suitably modified, may also be fastened to many existing lifting hooks that have a mounting bore 3 on the front part of their stem for the fastening shaft 11 of the safety latch. In hooks without a mounting bore, it is possible to use a suitable mounting part, such as a mounting band (not shown in the figures) fastened around the top part of the hook stem 4 or hook body 2 and having a mounting hole arranged for the fastening shaft 11 of the safety latch. The mounting band may be shaped to comply with the dimensions of the hook in such a manner that it rests against the support surfaces so as to prevent sliding along the hook. Consequently, a slight loosening of the mounting band does not result in a relative motion of the mounting band with respect to the hook, and the points of the shafts relevant to the operation of the mechanism remain substantially in the same places relative to one another.

The above description of the invention is only intended to illustrate the basic idea of to the invention. A person skilled in the art may thus vary its details within the scope of the accompanying claims without being restricted by the working examples described above.

The invention claimed is:

1. A lifting hook comprising:
a hook body with a hook stem and a hook tip;
a safety latch with a fastening end and a free latch end, the fastening end of the safety latch being pivotally fastened close to the hook stem so as to move the safety latch between an open position and a closed position, the safety latch being in its open position substantially against the inside of the hook body in a position that leaves a hook jaw free, while in the closed position of the safety latch the latch end extends across the hook jaw to the hook tip and against the hook tip, resting against the inside of the hook body and the hook jaw, closing the hook jaw; and
an actuator configured to actuate the safety latch, the actuator comprising a spring arranged between the safety latch and the hook body and forcing the latch end into the closed position, and a locking and release device for locking the safety latch into the open position and for releasing the safety latch from the open position,
wherein the locking and releasing device of the safety latch comprises a locking and releasing lever that is arranged to turn freely between a turning axle of the safety latch and the latch end in the front area of the safety latch and wherein in a locking position of the locking and releasing lever rests against the hook tip and keeps the safety latch in an open position against the inner side of the hook body.

2. The lifting hook as claimed in claim 1, wherein the locking and releasing lever comprises a bent wire loop, the ends of which are fastened to the safety latch to turn from sides thereof so that the locking and releasing lever resembles a closed loop.

3. The lifting hook as claimed in claim 1, wherein the locking and releasing lever comprises a two-part bent wire loop, the halves of which are joined together by a connecting piece in the area touching the hook tip, and the free ends are fastened to the safety latch to turn from sides thereof so that the assembled locking and releasing lever resembles a closed loop.

4. The lifting hook as claimed in claim 1, wherein the locking and releasing lever comprises a bent wire loop that is fastened at one end to the safety latch to turn on one side thereof so that the locking and releasing lever resembles an open loop.

5. The lifting hook as claimed in claim 1, wherein the locking and releasing lever comprises a plate-like part having on sides thereof fastening lugs that extend to the sides of the safety latch, and the locking and releasing lever is fastened to the safety latch by a fastening pin passing through the lugs.

6. The lifting hook as claimed in claim 1, wherein one edge of the safety latch has a cutting, into which a locking and releasing lever is arranged that fills the cutting and substantially complies with the shape of the adjacent safety latch portion, and the back surface of the lever has a fastening lug, and the locking and release lever is fastened to the back surface of the safety latch by a fastening pin passing through the lug.

7. The lifting hook as claimed in claim 1, wherein the centre of the safety latch has a cutting, into which a locking and releasing lever is arranged that fits into this cutting and extends partly to the top surface of the safety latch, and the back surface of the lever has a fastening lug, and the locking and release lever is fastened to the back surface of the safety latch by a fastening pin passing through the lug.

8. A safety latch for use in a lifting hook that comprises a hook body with a hook stem and hook tip, the safety latch being fastenable close to the hook stem and comprising:

a fastening end and a free latch end, the fastening end of the safety latch being pivotally fastened close to the hook stem so as to move the safety latch between an open position and a closed position, the safety latch being in the open position substantially against the inside of the hook body in a position that leaves a hook jaw free, while in the closed position of the safety latch the latch end extends across the hook jaw to the hook tip and against the hook tip, resting against the inside of the hook body and the hook jaw, closing the hook jaw; and an actuator configured to actuate the safety latch, the actuator comprising a spring arranged between the safety latch and the hook body and forcing the latch end into the closed position, and a locking and release device for locking the safety latch into the open position and for releasing the safety latch from the open position, wherein the locking and releasing device of the safety latch comprises a locking and releasing lever that is arranged to turn freely between a turning axle of the safety latch and the latch end in the front area of the safety latch and wherein in a locking position of the locking and releasing lever rests against the hook tip and keeps the safety latch in an open position against the inner side of the hook body.

9. The safety latch as claimed in claim 8, wherein the locking and releasing lever comprises a bent wire loop, the ends of which are fastened to the safety latch to turn from sides thereof so that the locking and releasing lever resembles a closed loop.

10. The safety latch as claimed in claim 8, wherein the locking and releasing lever comprises a two-part bent wire loop, the halves of which are joined together by a connecting piece in the area touching the hook tip, and the free ends are fastened to the safety latch to turn from sides thereof so that the assembled locking and releasing lever resembles a closed loop.

11. The safety latch as claimed in claim 8, wherein the locking and releasing lever comprises a bent wire loop that is fastened at one end to the safety latch to turn on one side thereof so that the locking and releasing lever resembles an open loop.

12. The safety latch as claimed in claim 8, wherein the locking and releasing lever comprises a plate-like part having on sides thereof fastening lugs that extend to the sides of the safety latch, and the locking and releasing lever is fastened to the safety latch by a fastening pin passing through the lugs.

13. The safety latch as claimed in claim 8, wherein one edge of the safety latch has a cutting, into which a locking and releasing lever is arranged that fills the cutting and substantially complies with the shape of the adjacent safety latch portion, and the back surface of the lever has a fastening lug, and the locking and release lever is fastened to the back surface of the safety latch by a fastening pin passing through the lug.

14. The safety latch as claimed in claim 8, wherein the centre of the safety latch has a cutting, into which a locking and releasing lever is arranged that fits into this cutting and extends partly to the top surface of the safety latch, and the back surface of the lever has a fastening lug, and the locking and release lever is fastened to the back surface of the safety latch by a fastening pin passing through the lug.

15. The safety latch as claimed in claim 8, wherein the safety latch is arranged to be fastened directly to a bore made on the hook stem or the top part of the hook body and intended for fastening the safety latch.

16. The safety latch as claimed in claim 8, wherein the safety latch comprises a mounting part for fastening around the hook stem or top part of the hook body.

17. The safety latch as claimed in claim 16, wherein the mounting part comprises a band to be fastened around a top part of the hook stem or hook body and having a hole arranged in a bent protrusion thereof for a turning and fastening shaft of the safety latch.

18. A locking and releasing device for a lifting hook safety latch, the lifting hook comprising a hook body with a hook stem and hook tip, and the safety latch having a fastening end and a free latch end, the fastening end of the safety latch being pivotally fastened close to the hook stem so as to move the safety latch between an open position and a closed position, the safety latch being in the open position substantially against the inside of the hook body in a position that leaves a hook jaw free, while in the closed position of the safety latch the latch end extends across the hook jaw to the hook tip and against the hook tip, resting against the inside of the hook body and the hook jaw, closing the hook jaw, and an actuator configured to actuate the safety latch, the actuator comprising a spring arranged between the safety latch and the hook body and forcing the latch end into the closed position, and the locking and release device being arranged to lock the safety latch into the open position and to release the safety latch from the open position, wherein the locking and releasing device of the safety latch comprises:

a locking and releasing lever that is arranged to turn freely between a turning axle of the safety latch and the latch end in the front area of the safety latch and wherein in a locking position of the releasing lever rests against the hook tip and keeps the safety latch in an open position against the inner side of the hook body.

19. The locking and releasing device for a lifting hook safety latch as claimed in claim 18, wherein the locking and releasing device comprises a bent wire loop, the ends of which are fastened to holes made on the side edges of the safety latch so that the locking and releasing lever resembles a closed loop.

20. The locking and releasing device for a lifting hook safety latch as claimed in claim 18, wherein the locking and releasing device comprises a two-part bent wire loop, the halves of which are joined together by a connecting piece in the area touching the hook tip, and the free ends are fastened to the safety latch to turn from sides thereof so that the assembled locking and releasing lever resembles a closed loop.

21. The locking and releasing device for a lifting hook safety latch as claimed in claim 18, wherein the locking and releasing device comprises a bent wire loop, one end of which is fastened to a hole made on one side edge of the safety latch so that the locking and releasing lever resembles an open loop.

22. The locking and releasing device for a lifting hook safety latch as claimed in claim 18, wherein the locking and releasing device comprises a plate-like part having on sides thereof fastening lugs that extend to the sides of the safety latch, and the locking and releasing lever is fastened to holes made on the side edges of the safety latch by a fastening pin passing through the lugs.

* * * * *